PICKUP MOUNTING

Filed April 3, 1946

INVENTOR.

Charles E. Kilgour

BY Alden D. Redfield

Atty

Patented June 6, 1950 2,510,342

UNITED STATES PATENT OFFICE 2,510,342

PICKUP MOUNTING

Charles E. Kilgour, Cincinnati, Ohio, assignor, by mesne assignments, to AVCO Manufacturing Corporation, a corporation of Delaware Application April 3, 1946, Serial No. 659,215

2 Claims. (Cl. 274—24)

This invention relates to phonograph reproduction and is particularly concerned with the reproduction of sound from laterally cut disk records. While the invention is illustrated in connection with reproduction through a piezo-electric crystal, it can be availed of in connection with other types of pick-ups such as those that establish a variable magnetic field or a variable intensity of light from which suitable variations in electric current are derived.

The invention is specifically concerned with a method of and means for mounting the pick-up means, e. g., a pick-up cartridge, in a tone arm and the construction of a motion transferring device by which the modulations in the grooves in a phonograph record are transferred to the pick-up.

In the reproduction of sound from a phonograph record by means of a pick-up generating an electrical signal which is amplified and impressed upon a translation device such as a loud speaker to produce sound, a certain amount of sound is produced directly by the vibration of the pick up and associated structure. This is called acoustic radiation and is a fault that has been magnified by mounting the pick up in the tone arm by means which permits these sound waves to travel into the tone arm and radiate therefrom. With customary types of apparatus, this direct radiation of sound may be of considerable magnitude and of distorted quality so as to be quite annoying to the listener, especially when the electrically produced sound is adjusted to a low volume level. I have discovered that this radiation of sound (needle noise) may be substantially reduced in loudness when the pick-up is mechanically isolated from the tone arm. This isolation may be effected by suspending the pick-up from the tone arm by yielding, non-conducting, non-resonant means such as fabric or felt.

Where, for example, a crystal pick-up is used, it is possible to hang the pick-up cartridge from the tone arm whenever the weight of the cartridge exceeds the desired pressure of the stylus or needle on the record. The weight of the cartridge may be augmented if required, although it is preferable to maintain the weight on the record at a minimum. When the cartridge weight substantially exceeds the needle pressure, the tone arm may be counterbalanced by springs or weights so as to exert a lifting force upon the cartridge. In this case, the structural member or members connecting the arm and cartridge are subjected to tensile stresses only so that cords or other flexible supports may be used.

With the commonly used disk record, with a spiral groove, it is necessary for the cartridge to exert enough lateral pressure on the tone arm to cause it to swing horizontally and follow the groove. This result may be accomplished by the type of support described above. The supporting tension members will swing slightly out of vertical alignment so that the horizontal component of their stress is sufficient to move the arm. Any tendency toward misalignment may be reduced by an increase in the tension of the supporting members which may be brought about by an increase in the difference between the cartridge weight and the needle pressure. Stability of the cartridge in vertical alignment may be enhanced by an increase in the vertical distance between the center of gravity of the cartridge and the point of connection of the flexible supporting member and the rigid cartridge.

An important object of the invention is the reduction of acoustic radiation or needle noise.

Another object is to reduce wear on phonograph records.

Another object is to organize the components of a sound reproduction system so that undesired high frequency responses or peaks are eliminated.

The novel features that I consider characteristic of the invention are set forth in the appended claims. The invention, itself, however, both as to its organization and its method of operation, together with additional objects and advantages thereof, will best be understoood from the following description of specific embodiments when read in conjunction with the accompanying drawings, in which—

Figures 1, 2, 3, 4, 5, 6, 7, 8, 9, 10, 11, 12, 13, 14, 15, 16:
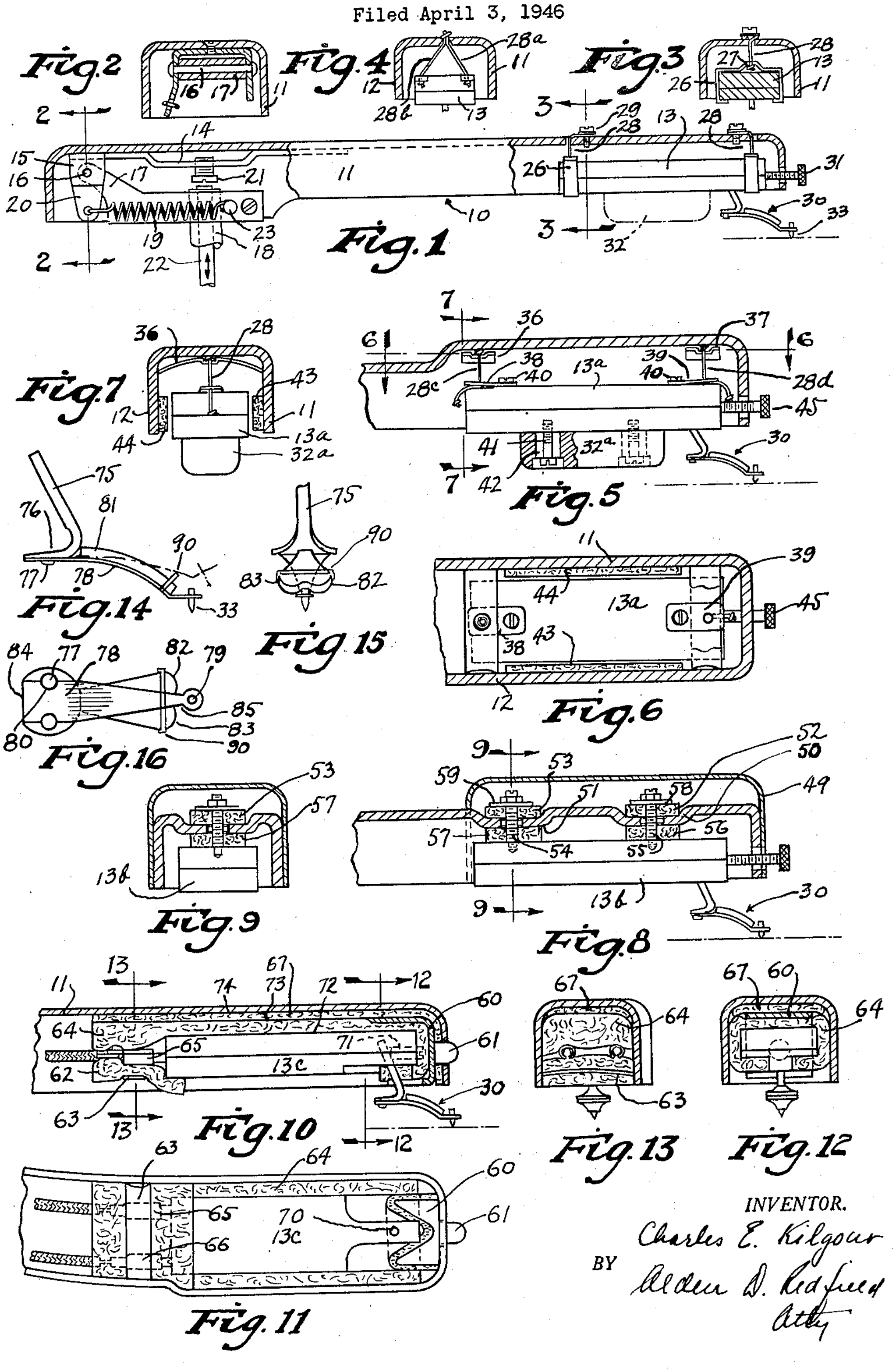
Fig. 1 is a side elevation with parts and a section of a tone arm in which the features of the invention are incorporated.
Fig. 2 is a section taken along line 2—2 of Fig. 1.
Fig. 3 is a section taken along line 3—3 of Fig. 1.
Fig. 4 is a section similar to Fig. 3 showing a modified form of the device.
Fig. 5 is a longitudinal section with the parts cut away of another device embodying the invention.
Fig. 6 is a section along line 6—6 of Fig. 5.
Fig. 7 is a section along line 7—7 of Fig. 5.
Fig. 8 is a fragmentary section taken longitudinally of a tone arm showing another way in which the principles of the invention may be utilized.
Fig. 9 is a section along line 9—9 of Fig. 8.
Fig. 10 is a fragmentary section showing how the pick-up cartridge may be isolated in still another way.
Fig. 11 is a bottom view of the device shown in Fig. 10 with the phonograph stylus and its associated members removed.
Fig. 12 and Fig. 13 are sections taken respectively along lines 12—12 and 13—13 of Fig. 10.
Fig. 14, Fig. 15 and Fig. 16 are elevation, end and plan views respectively of an assembly by which a permanent point stylus or needle may be connected to a pick-up cartridge.

In Figs. 1 to 3 a tone arm 10 is provided with down-turned sides 11 and 12, and at the end thereof a motion translating means 13 such as a crystal cartridge is mounted in the manner hereinafter described. At the other end of the tone arm is provided a reinforcing bracket 14 secured to the upper side of the arm and this bracket has down-turned ears 15 having openings to receive a pivot 16 supported in a member 17 that is mounted on the sleeve 18. As will be recognized, this illustrates a more or less standard form of construction in which the tone arm is mounted so that it may be moved in a horizontal plane by a record changing mechanism that turns sleeve 18 at predetermined intervals.

In order to balance the weight of the device at the other end of the tone arm, a spring 19 may be tensioned between lug 23, secured to member 17, and an extension 20 on one of the ears 15 of member 14. This tends to cause the other end of the tone arm to move upwardly about the pivot 16.

An adjustable screw 21 is secured to member 14 at a point opposite a push rod 22 connected to the record changing mechanism. As is well known in the art, the rod 22 periodically rises to lift the tone arm so that the stylus mounting device 30 carrying the stylus or needle 33 is disengaged from the record.

In Figs. 1 and 3, the crystal cartridge is mounted by hanging the same on flexible cords 28. Each end of the cartridge is carried by a stirrup 26 that can be snapped into place and each stirrup is provided centrally with a boss 27 in which is provided a suitable opening. Studs 29 may be secured in the top of the tone arm and the cords 28 thereby adjustably secured in position as shown in the figures. As shown, the lower ends of the cords are knotted in order to hold them in place against the under side of the openings in bosses 27.

In Fig. 4 an illustrative form of the invention is shown with four cords, 28*a* and 28*b*, two along each longitudinal edge of the cartridge. Only two of these four are shown in this figure. These may be secured to the cartridge by knotting the ends through openings provided in stirrups or holding members similar to those shown in Fig. 3, and knotting the upper ends through openings in the upper side of the tone arm.

The cords 28*a* and 28*b* may consist of any suitable flexible, non-resonant material incapable of transmitting sound vibrations and capable of mechanically isolating the cartridge from the tone arm. They may be of elastic material such as rubber.

In Fig. 1 a stylus mounting 30 is shown by means of which a stylus 33 is mounted in the cartridge 13. A knurled screw 31 is provided by which the shank of the stylus mounting means is held in a suitable chuck (not shown) provided in the cartridge. A weight 32 may be provided on the under side of the cartridge if desired in order to obtain proper relationships between tension on the cords, the weight of the cartridge and the force exerted against the needle by the record.

In order to increase the alignment stability of the cartridge, the sides 11 and 12 of the tone arm may be provided with yieldable non-resonant material such as soft felt to limit sideward movement of the cartridge and restrain it from swinging an inordinate amount. Such a structure is shown in Figs. 5, 6 and 7, in which a cartridge 13*a* is suspended by cords 28*c* and 28*d*. Flat springs 36 and 37 may be provided on the under side of the tone arm, and spring clips 38 and 39 may be secured to the cartridge by studs 40 by which the cord length may be conveniently adjusted.

In Figure 5, a weight 32*a* may be secured to the bottom of the cartridge by studs 41, the weights having slots 42 for the purpose of facilitating adjustment.

The yieldable non-resonant material referred to above may be constituted of soft felt pads 43 and 44, one on each of the downwardly extending sides 11 and 12 of the tone arm. As has been indicated, these prevent the cartridge from swinging out of position, yet insure maximum mechanical isolation from the tone arm. The stylus mounting 30 is secured in chuck (not shown) by knurled screw 45.

In Figs. 8 and 9, a modified construction is shown, in which the upper part of the tone arm is provided with depressions 50 and 51, adapted and arranged to hold washers 52 and 53 of yieldable, non-resonant material, such as soft felt, having the capability of isolating the cartridge from the tone arm. As shown, the material of the tone arm is cut away a substantial extent in order to permit studs 54 and 55 to be extended through the arm without mechanical contact therewith. Additional washers 56 and 57 are provided on the under side of the tone arm. These may be cemented to the arm and to the cartridge in order that the cartridge may hang on the arm, in which case studs 54 and 55 should not be drawn up against washers 52 and 53. The studs are simply inserted into suitable threaded openings in or attached to the cartridge 13*b* with a felt isolating means disposed on each side of the arm in the manner shown. Relatively stiff washers 58 and 59 may be provided to distribute the weight of the cartridge on the top washers 52 and 53. A housing 49 of light metal or plastic may be provided around the end of the tone arm in order to preserve a neat appearance and to provide an additional space 48 to retard the direct radiation of sound.

In Figs. 10 to 13, still another embodiment of the invention is shown. In this embodiment, the cartridge 13*c* is floated in yielding non-conducting, non-resonant material such as felt and makes no contact directly with the tone arm. A bent member 60 is formed enclosing the front end of the cartridge and is provided with an enlargement 61 which fits into an opening in the front end of the tone arm. Member 60 with enlargement 61 holds the front end of the cartridge in place in the tone arm in cooperation with felt members 62, 64 and 67. A spring clamp 63 holds the rear end of the cartridge between felt members 62 and 64 under a minimum amount of compression. Soldering lugs or leads 65 and 66 secured to cartridge 13*c* afford a good base upon which the felt supporting members may grip.

The member 60 is isolated from the cartridge 13*c* by the front end of the felt member 64 which preferably extends around the end of the cartridge, and from the tone arm by a felt member 67, the sides of which follow the inside contour of the tone arm to isolate it laterally from the cartridge. The cartridge may be cemented to felt 64 and member 67 may be cemented to 64 and 11, as at 72, 73 and 74.

The stylus mounting means 30 is secured in the cartridge by inserting its shank through chuck 70 and holding it there by screw 71.

In Figs. 14, 15 and 16 I have shown a stylus mounting assembly particularly well adapted for use with the present invention in that it reduces needle scratch and other high frequency vibrations and tends to prevent them from resonating with the cartridge assembly. This stylus assembly is shown in my copending divisional application Serial No. 84,899, filed April 1, 1949, entitled "Stylus mounting for sound reproducer" and assigned to the same assignee as the present application and invention. This comprises a shank 75 having an end 76 bent at approximately the angle shown. The under side of the bent end 76 has bosses 77 adapted to be swaged over to hold spring member 78 securely against the over turned end 76. Spring member 78 has notches 80 in its sides that closely fit around the sides of the bosses and conform to their contours. Spring member 78 may conveniently be made of resilient springy material such as beryllium bronze.

The other end of the spring 78 is provided with an opening 79 in which a permanent point stylus such as a sapphire 33 is press fitted. A damping member 81 is provided along one side, preferably the upper side of the spring member 78. Member 81 is cemented or otherwise secured along the whole upper surface of member 78 and is extended horizontally, as in the form of heart shaped lobes 82 and 83. The mass of member 81 is thus spread out and distributed in a horizontal plane rather than being concentrated at one point. The construction, configuration and mass of the damping material 81 and its distribution over the surface of spring 78 is such that a very effective damping of peak resonances at the high frequency end of the audio range is achieved. Member 81 may be conveniently made of any suitable damping material such as a plasticized Celluloid.

In order to maintain the bending stress uniform throughout its length, the flat spring member 78 is made with a relatively wide base 84 and narrow end 85 as shown in Fig. 16, enlarged again at its outer end for the purpose of receiving and holding stylus 33.

It should be noted that the point of the needle 33 is in substantial alignment with the plane of spring 78 when the weight of the pick-up is on the record, as indicated in dot and dash lines in Fig. 14. This minimizes the torsional forces upon the spring 78 and tends to decrease its compliance in a horizontal plane. This also makes it possible to obtain maximum twisting effect on the crystal where the forces from the record are applied by the shank 75. Nevertheless, a large amount of vertical compliance is permitted. Since substantial forces are exerted on the needle by reason of the tortuous character of the grooves and rapid changes in groove width—that tend to raise and lower the whole pick-up—this vertical compliance in cooperation with the damping means acts as a mechanical filter to effect a substantial diminution in high frequency noise, not only with respect to that radiated acoustically but also that which is transmitted electrically.

The base 84 of the spring member 78 may be enlarged so that it coincides with the full surface of the bottom side of out-turned member 76, and openings 80 may be holes instead of notches to fit over the bosses 77 of member 76. This strengthens the construction considerably.

In addition, the damping effect may be very considerably enhanced by the provision of a bracing member 90 made of aluminum, magnesium, or some light relatively stiff metal alloy or other material. As illustrated, this additional damping member is constructed of a U shape as shown in Figs. 14, 15 and 16, and the ends of the U are secured as by cementing or clamping them to the sides of the lobes 82 and 83 of the damping means 81. The mass of member 90 should be kept to a minimum. Tying the edges together strengthens the spread-out dampening member 81, increases the dampening effect and reduces needle scratch and other undesirable highs.

Having thus described by invention, I claim:

1. In a sound translating device for use with sound disc records, the combination of a floating pickup having a stylus secured thereto, a tone arm, means associated with said arm for securing said pickup entirely in suspension from said tone arm, said means comprising a pair of spaced tension cords made of acoustic damping material, one of said cords securing the front end of said pickup to said tone arm, the other of said cords securing the back end of said pickup to said tone arm, and counterbalancing means for leveling said tone arm to maintain said cords in tension, the gravitational turning moment of said pickup about an axis transverse to the pickup at the point whereat said other cord is secured to said pickup being greater than the opposite moment produced by stylus pressure on a sound disc record.

2. In a sound translating device for use with sound disc records, the combination of a floating pickup having a stylus secured thereto, a tone arm, a coupler associated with said arm for securing said pickup entirely in suspension from said tone arm, said coupler comprising a pair of spaced tension means made of acoustic damping material, one of said means securing the front portion of said pickup to said tone arm, the other of said means securing the back portion of said pickup to said tone arm, counterbalancing means for leveling said tone arm to maintain said means in tension, the gravitational turning moment of said pickup about an axis transverse to the pickup at the point whereat said other means is secured to said pickup being greater than the opposite moment produced by stylus pressure on a sound disc record.

CHARLES E. KILGOUR.

REFERENCES CITED

The following references are of record in the file of this patent:

UNITED STATES PATENTS

| Number | Name | Date |
|---|---|---|
| 1,165,288 | Rimmer | Dec. 21, 1915 |
| 1,281,135 | Claybrook | Oct. 8, 1918 |
| 1,325,209 | Sandell | Dec. 16, 1919 |
| 1,529,427 | Giselman | Mar. 10, 1925 |
| 1,721,362 | Weir | July 16, 1929 |
| 1,728,800 | Robinson | Sept. 17, 1929 |
| 2,174,692 | Dunning | Oct. 3, 1939 |
| 2,187,772 | Dally | Jan. 23, 1940 |
| 2,230,865 | Hutter | Feb. 4, 1941 |
| 2,270,902 | Rubissow | Jan. 27, 1942 |
| 2,313,129 | Dohan | Mar. 9, 1943 |
| 2,320,416 | Dally | June 1, 1943 |
| 2,331,122 | Jones | Oct. 5, 1943 |

FOREIGN PATENTS

| Number | Country | Date |
|---|---|---|
| 64,045 | Denmark | Oct. 22, 1945 |